US012575485B2

(12) United States Patent
Arendt et al.

(10) Patent No.: US 12,575,485 B2
(45) Date of Patent: Mar. 17, 2026

(54) GROUNDS MAINTENANCE VEHICLE WITH TRACTION AND STEERING CONTROL SYSTEM

(71) Applicant: THE TORO COMPANY, Bloomington, MN (US)

(72) Inventors: Peter M. Arendt, Richfield, MN (US); Jackie R. Gust, Northfield, MN (US)

(73) Assignee: THE TORO COMPANY, Bloomington, MN (US)

( * ) Notice: Subject to any disclaimer, the term of this patent is extended or adjusted under 35 U.S.C. 154(b) by 862 days.

(21) Appl. No.: 17/058,774

(22) PCT Filed: Jun. 11, 2019

(86) PCT No.: PCT/US2019/036500
§ 371 (c)(1),
(2) Date: Nov. 25, 2020

(87) PCT Pub. No.: WO2019/241214
PCT Pub. Date: Dec. 19, 2019

(65) Prior Publication Data
US 2021/0195834 A1      Jul. 1, 2021

Related U.S. Application Data

(60) Provisional application No. 62/685,423, filed on Jun. 15, 2018.

(51) Int. Cl.
*A01D 34/00*          (2006.01)
*A01D 34/64*          (2006.01)
(Continued)

(52) U.S. Cl.
CPC ........... *A01D 34/008* (2013.01); *A01D 34/64* (2013.01); *B60K 31/04* (2013.01); *B62D 6/002* (2013.01); *A01D 2101/00* (2013.01)

(58) Field of Classification Search
CPC .. A01D 34/008; A01D 34/64; A01D 2101/00; B60K 31/04; B62D 6/002
See application file for complete search history.

(56) References Cited

U.S. PATENT DOCUMENTS

| | | |
|---|---|---|
| 4,191,270 A | 3/1980 | Monteith |
| 4,787,646 A | 11/1988 | Kamlukin et al. |

(Continued)

FOREIGN PATENT DOCUMENTS

WO          2019241214 A1     12/2019

OTHER PUBLICATIONS

International Search Report and Written Opinion For PCT Appl. No. PCT/US2019/036500, dated Aug. 23, 2019, 14 pages.

(Continued)

*Primary Examiner* — Valentin Neacsu
*Assistant Examiner* — Michael R Stabley
(74) *Attorney, Agent, or Firm* — Mueting Raasch Group

(57) ABSTRACT

A traction and steering control system and method for a small- or zero-radius-turning maintenance vehicle. The traction and steering control system may determine operator intended speed and direction by monitoring positions of speed and directional control members and one or more operational parameters of the vehicle. The vehicle may then generate drive wheel speed commands that achieve the intended speed and direction by determining how best to manipulate the left and right drive wheels. In some instances, the drive wheel speed commands are disproportionately related to the positions of the speed and directional control members.

17 Claims, 7 Drawing Sheets

(51) Int. Cl.
　　B60K 31/04　　　(2006.01)
　　B62D 6/00　　　(2006.01)
　　*A01D 101/00*　　　(2006.01)

(56)　　　　　　References Cited

U.S. PATENT DOCUMENTS

| | | | |
|---|---|---|---|
| 5,249,422 A | 10/1993 | Smith et al. | |
| 5,913,802 A | 6/1999 | Mullet et al. | |
| 6,422,333 B1 * | 7/2002 | Kjær | B60T 8/3205 |
| | | | 180/197 |
| 6,591,593 B1 | 7/2003 | Brandon et al. | |
| 6,808,032 B2 | 10/2004 | Wuertz et al. | |
| 6,808,037 B1 | 10/2004 | Mueller | |
| 7,172,041 B2 | 2/2007 | Wuertz et al. | |
| 8,047,310 B2 | 11/2011 | Kallevig | |
| 8,424,625 B2 * | 4/2013 | Ishii | B60W 20/00 |
| | | | 180/65.51 |
| 8,544,570 B2 * | 10/2013 | Ishii | B62D 11/24 |
| | | | 701/41 |
| 8,572,940 B2 * | 11/2013 | Schmidt | A01D 34/62 |
| | | | 56/11.1 |
| 9,623,903 B2 | 4/2017 | Cook et al. | |
| 9,701,309 B2 * | 7/2017 | Fairgrieve | B60W 30/18172 |
| 9,725,114 B1 | 8/2017 | Brown et al. | |
| 9,764,734 B1 | 9/2017 | Brown | |
| 9,864,396 B1 | 1/2018 | Brown et al. | |
| 10,676,130 B1 * | 6/2020 | Hauser | A01D 69/025 |
| 10,836,426 B1 * | 11/2020 | Busboom | B62D 11/04 |
| 2008/0072556 A1 | 3/2008 | Tegtmeier et al. | |
| 2012/0227369 A1 | 9/2012 | Koike et al. | |
| 2015/0081153 A1 | 3/2015 | Wyatt et al. | |
| 2015/0217770 A1 * | 8/2015 | Fairgrieve | B60K 28/16 |
| | | | 701/82 |
| 2017/0120922 A1 | 5/2017 | Schaedler et al. | |

OTHER PUBLICATIONS

International Preliminary Report on Patentability for PCT Appl. No. PCT/US2019/036500, dated Apr. 20, 2020, 16 pages.
U.S. Appl. No. 62/685,423, filed Jun. 15, 2018.

* cited by examiner

GROUNDS MAINTENANCE VEHICLE WITH TRACTION AND STEERING CONTROL SYSTEM

This application is a 35 U.S.C. § 371 U.S. National Stage of International Application No. PCT/US2019/036500, filed Jun. 11, 2019, which claims the benefit of U.S. Provisional Application No. 62/685,423, filed Jun. 15, 2018, both of which are incorporated herein by reference in their entireties.

Embodiments of the present disclosure relate to grounds (e.g., turf) maintenance vehicles and, more particularly, to traction and steering control systems and methods for use with the same.

BACKGROUND

Turf maintenance vehicles for carrying out diverse tasks are known. For instance, power lawn mowers are well-known for maintaining turf areas. Such mowers range from small, walk-behind mowers such as those used by homeowners, to professional-grade walk-behind and riding mowers (sit-on or stand-on) adept at mowing correspondingly larger areas.

Large mowers often incorporate a prime mover such as an internal combustion engine and a hydraulic drive system. To permit mowing both large areas as well as intricate lawn borders, the drive system may include left and right hydraulic motors coupled to left and right drive wheels, respectively. When power is transmitted from the prime mover to the left and right hydraulic motors, e.g., via one or more pumps, the left and right drive wheels may rotate. The rotational speed and direction of each drive wheel may then be controlled by associated left and right drive control levers that are manipulated by an operator. The drive control levers are typically connected directly to the motors such that the speed and direction of each drive wheel is directly proportional to the position of its associated lever. By manipulating the control levers independently, each drive wheel can be separately driven forward or backward at varying speeds. Thus, the mower may be propelled forwardly or in reverse. By powering one wheel in the forward direction and slowing, stopping, or powering the opposite wheel in the reverse direction, the mower can execute a turn. In some instances, such vehicles may be able to make very small-, or even zero-, radius turns. Accordingly, such vehicles are often referred to as zero-turn-radius or "ZTR" vehicles.

More recently, electric riding mowers have become available in both consumer and professional markets alike. While effective, performance characteristics of electric motors may be distinctly different than their hydraulic counterparts. For example, electric motors may provide slower response as compared to hydraulic systems. These differences may present undesirable, or at least unfamiliar, performance response to the operator.

SUMMARY

Embodiments described herein may provide a turf maintenance vehicle that may incorporate various aspects in any combination. In one aspect, the vehicle may include: a frame with a front end and a rear end; first and second drive members connected to opposite sides of the frame and adapted to propel the vehicle over a ground surface; and a traction and steering control system adapted to independently provide power to each of the first and second drive members. In another aspect, first and second control inputs may be provided. In another aspect, first and second input sensors are provided and adapted to detect manipulation of the first and second inputs, respectively, and output first and second input signals, respectively. In yet another aspect, a controller is provided adapted to receive the first and second input signals and generate output commands to the traction and steering control system based thereon. In still another aspect, the output commands, at least in some circumstances, are disproportionate to the first and second input signals. In still yet another aspect, the traction and steering control system may include first and second motors connected to the first and second drive members, respectively. In another aspect, the first and second motors may be first and second electronically-controlled motors, respectively. In yet another aspect, the traction and steering control system includes one or more of a generator and a battery adapted to power the first and second electronically-controlled motors.

In another embodiment, a turf maintenance vehicle is provided that includes various aspects in any combination. In one aspect, the vehicle includes: a frame having a front end and a rear end; coaxial first and second drive wheels connected to opposite sides of the frame and adapted to propel the vehicle over a ground surface; and a traction and steering control system adapted to independently provide power to each of the first and second drive wheels, wherein a speed and direction of the first and second drive wheels are variable such that the vehicle may turn about a turn center that lies upon an arc origin line that is coaxial with an axis of rotation of the first and second drive wheels. In another aspect, the vehicle may include first and second control levers movable relative to the frame. In yet another aspect, the vehicle may include first and second lever position sensors adapted to sense a position of the first and second control levers, respectively, and output first and second lever position signals, respectively. In still yet another aspect, a controller is provided and adapted to receive the first and second lever position signals and generate output commands based thereon to the traction and steering control system. In another aspect, the controller may generate output commands that ensure the turn center is located only within designated turn regions along the arc origin line. In still another aspect, the designated turn regions may include regions laterally spaced-apart from each of the first and second drive wheels. In yet another aspect, the traction and steering control system includes first and second motors connected to the first and second drive members, respectively. In still yet another aspect, the first and second motors include first and second electronically-controlled motors, respectively. And in still another aspect, the traction and steering control system further includes one or more of a generator and a battery adapted to provide power to the first and second electronically-controlled motors.

In yet another embodiment, a method of controlling a traction and steering control system of a turf maintenance vehicle is provided. The method may include various aspects in any combination. For instance, the method may include: monitoring, with an electronic controller, relative positions of a first drive control lever and a second drive control lever; determining, with the electronic controller, a turn center of the vehicle corresponding to the relative positions of the first and second drive control levers; and determining if the turn center falls inside a scrub region. Another aspect may include selecting, with the electronic controller, a position of an adjusted turn center that lies outside the scrub region, while another aspect includes generating commands to left and right coaxial drive members so that the vehicle turns about the adjusted turn center. In still yet another aspect, the scrub region includes: a first scrub region that extends laterally inboard and outboard of the first drive member; and a second scrub region that extends laterally inboard and outboard of the second drive member. In yet another aspect, selecting the position of the adjusted turn center includes one or both of accelerating an outside drive member and decelerating an inside drive member.

In still another embodiment, a method of controlling a traction and steering control system of a turf maintenance vehicle during a vehicle turn is provided wherein the method includes various aspects in any combination. In one aspect, the method includes monitoring, with an electronic controller, relative positions of a first drive control lever and a second drive control lever; calculating, with the electronic controller, an intended heading of the vehicle corresponding to the positions of the first and second drive control levers; and detecting, with the controller, one or more operational parameters of the vehicle. In another aspect, the method includes determining, with the controller, based upon the one or more operational parameters, whether to: decelerate an inside drive wheel; accelerate an outside drive wheel; or both to achieve the intended heading. In another aspect, the method includes generating commands to inside and outside drive wheels to propel the vehicle along the intended heading. In still another aspect, the one or more operational parameters includes a parameter selected from the group consisting of vehicle slope, linear acceleration, centripetal acceleration, and speed. In yet another aspect, the one or more operational parameters includes a parameter indicative of a torque or torque limitation of one or both of the drive wheels.

In yet another embodiment, a method of controlling a traction and steering control system of a turf maintenance vehicle is provided, wherein the method includes various aspects in any combination. In one aspect, the method includes: monitoring, with an electronic controller, relative positions of a first drive control lever and a second drive control lever; calculating, with the electronic controller, an intended deceleration of the vehicle corresponding to the positions of the first and second drive control levers; and detecting, with an onboard sensor, an actual deceleration. In another aspect, the method includes comparing, with the controller, the intended deceleration to the actual deceleration to determine if one or both of a left and a right drive member have lost traction. And in yet another aspect, the method includes adjusting, with the controller, commands to the left and right drive members to restore traction to the left and right drive members, respectively.

In still another embodiment, a method of controlling a traction and steering control system of a turf maintenance vehicle is provided, wherein the method includes various aspects in any combination. In one aspect, the method includes: monitoring, with an electronic controller, relative positions of a first drive control lever and a second drive control lever; determining, with the electronic controller, an intended acceleration of the vehicle corresponding to the positions of the first and second drive control levers; and detecting, with an onboard sensor, an actual acceleration of the vehicle. In another aspect, the method may include calculating a maximum permitted acceleration of one or both of a first and second drive wheel. And in yet another aspect, the method may include limiting acceleration of one or both of the first and second drive wheels to a magnitude less than or equal to the maximum permitted acceleration.

In yet still another embodiment, a method of controlling a traction and steering control system of a turf maintenance vehicle is provided, wherein the method includes various aspects in any combination. In one aspect, the method includes: monitoring, with an electronic controller, relative positions of a first drive control lever and a second drive control lever; determining, with the electronic controller, an intended acceleration of the vehicle; and measuring an actual acceleration of the vehicle. In another aspect, the method includes generating, with the electronic controller, acceleration commands that are less than or equal to the actual acceleration.

In yet still another embodiment, a method of controlling a traction and steering control system of a turf maintenance vehicle is provided, wherein the method includes various aspects in any combination. In one aspect, the method includes: monitoring, with an electronic controller, relative positions of a first drive control lever and a second drive control lever; and determining, with the electronic controller, when a position of one or both of the drive control levers indicates an intended change between forward and reverse directions of a first drive wheel. In another aspect, the method includes commanding, with the electronic controller, a change in speed of the first drive wheel to zero velocity. In yet another aspect, the method includes accelerating the speed of the first drive wheel to a first velocity calculated to provide a desired heading based upon the relative positions of the first and second drive control levers. In yet another aspect, the method includes commanding, with the electronic controller, a change in speed of a second drive wheel to zero velocity as the first drive wheel slows to zero velocity. And in still another aspect, the method includes accelerating the speed of the second drive wheel to a second velocity calculated to provide the desired heading based upon the relative positions of the first and second drive control levers.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
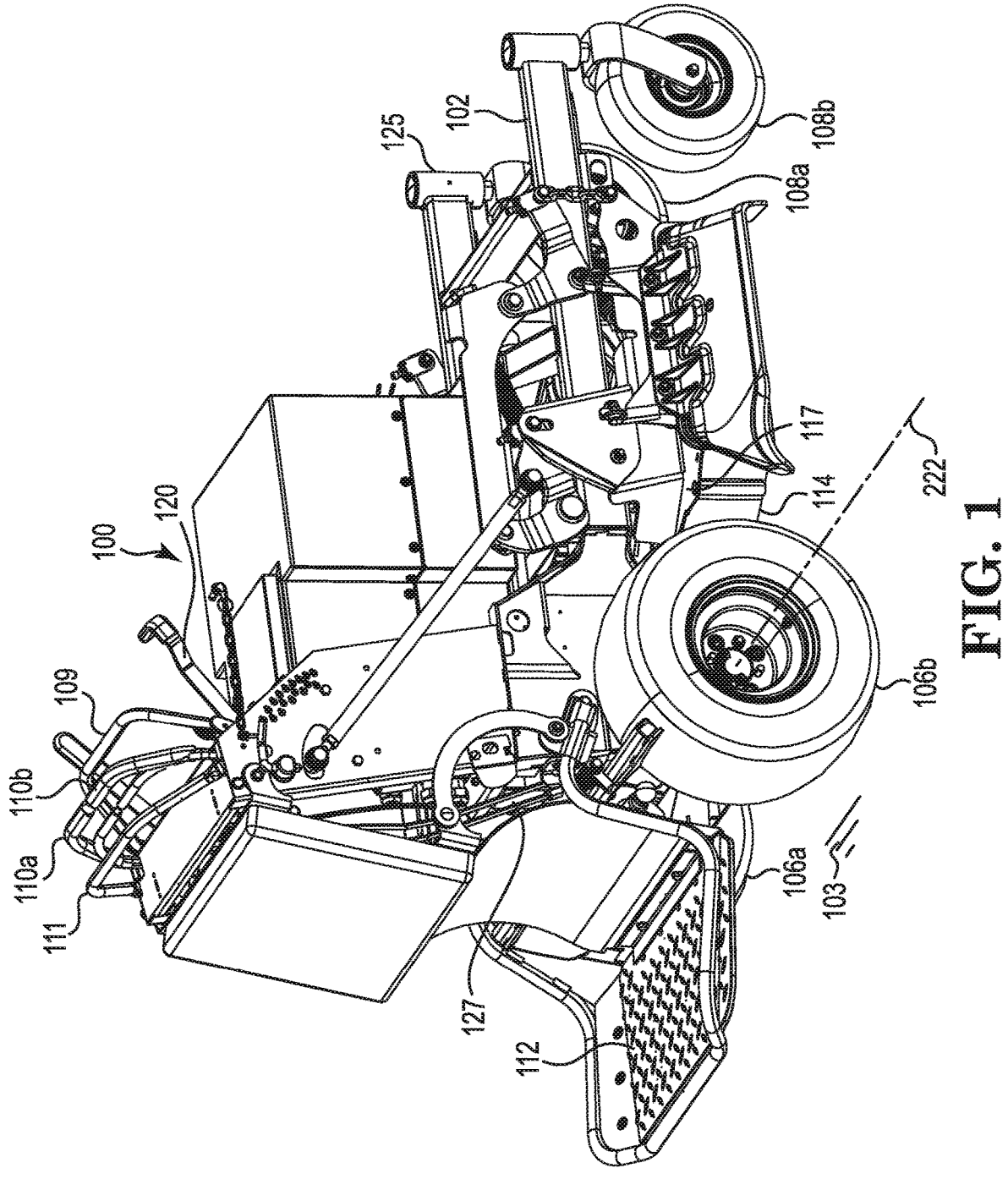
FIG. 1 is a perspective view of an electric grounds maintenance vehicle, e.g., an electric stand-on mower, in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" means one or all of the listed elements or a combination of any two or more of the listed elements. "I.e." is used as an abbreviation for the Latin phrase id est and means "that is." "E.g." is used as an abbreviation for the Latin phrase exempli gratia and means "for example."

Embodiments of the present disclosure are directed to grounds maintenance (e.g., turf maintenance) vehicles and traction and steering control systems and methods for use with the same. In some embodiments, the vehicle is a riding (e.g., stand-on) lawn mower having differentially driven wheels providing zero-turn-radius (ZTR) capability. The vehicle may include a twin-stick propulsion control system as is known in the art wherein a first (e.g., left) control lever or stick controls speed and rotational direction of a first (e.g., left) drive wheel, and a second (e.g., right) control lever or stick controls speed and rotational direction of a second (e.g., right) drive wheel. Accordingly, independent manipulation of the two sticks may change the speed and direction of the vehicle as is known in art.

Unlike a conventional hydraulically powered ZTR, embodiments of the present disclosure may utilize independent motors, e.g., electronically-controlled motors, to power each drive wheel. Moreover, instead of direct, mechanical connection of the control levers to their respective wheel motors, embodiments of the present disclosure may utilize an electronic controller that receives inputs (which may be control lever positions), and outputs electrical commands to the two wheel motors to manipulate the speed and direction of the vehicle in accordance with the intent conveyed by the control lever positions (i.e., a "drive-by-wire" system). Unlike conventional, mechanically coupled directional control lever systems, embodiments of the present disclosure may utilize the electronic controller to analyze not only control lever positions, but also various other parameters regarding vehicle status and dynamics (e.g., true ground speed, linear and centripetal acceleration, torque and/or a torque limitation detected at one or both drive wheels, vehicle slope, etc.), and generate command outputs to the wheel motors based at least in part upon these other parameters. That is to say, output commands from the controller to the wheel motors may, in some (but not necessarily all) circumstances, be disproportionate (i.e., not correspond directly to) to the actual positions of the control levers (this behavior is, again, in contrast to conventional ZTR traction control and steering systems that generate wheel motor commands that are directly proportional to the respective lever positions). Such control systems may provide various benefits including reduction of wheel slip under various conditions, and more responsive vehicle turning.

Figure 2:
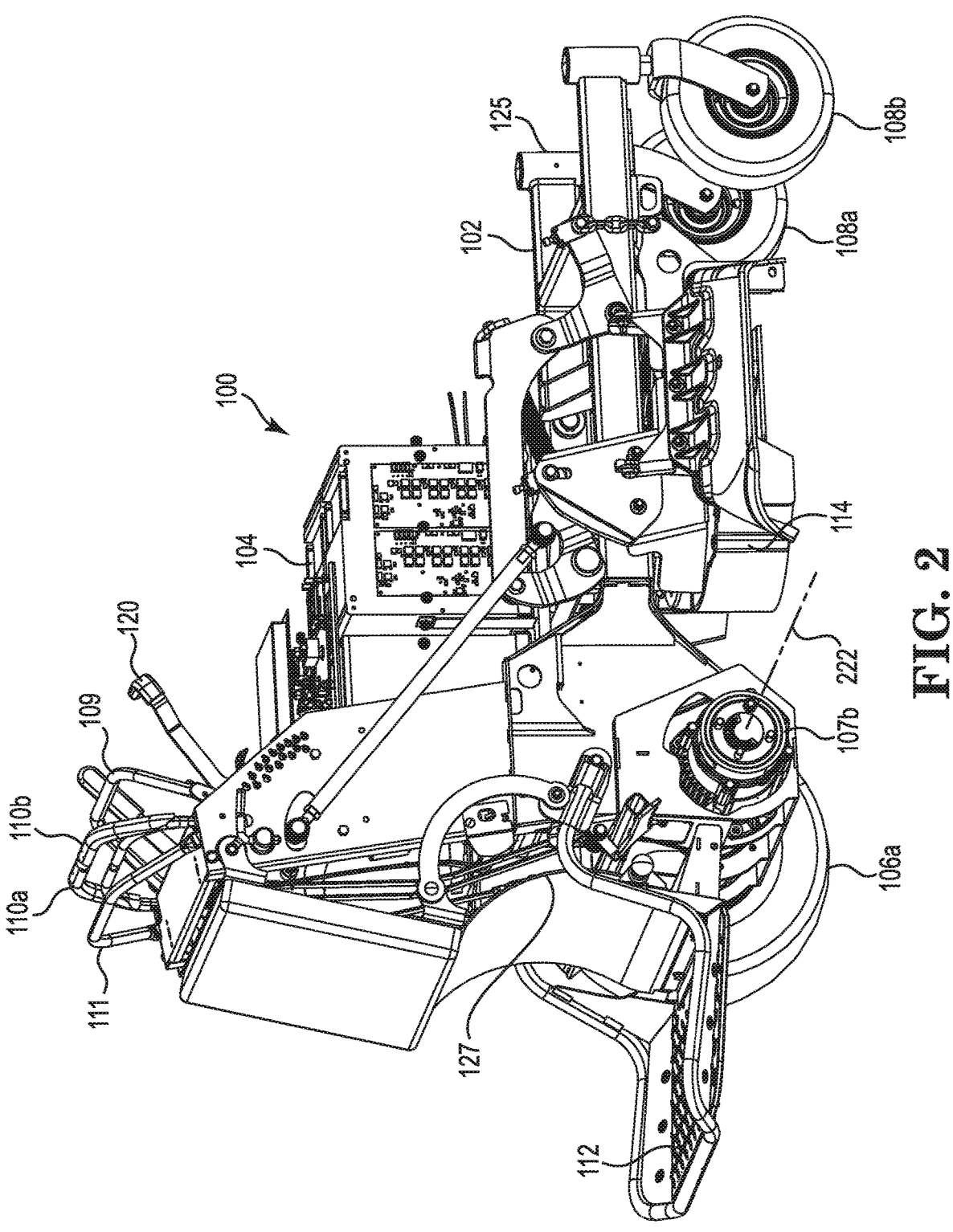
FIG. 2 is a view similar to FIG. 1, but with portions removed to illustrate various aspects of the mower.

With reference to the figures of the drawing, wherein like reference numerals designate like parts and assemblies throughout the several views, FIGS. 1 and 2 illustrate a turf maintenance vehicle in accordance with one exemplary embodiment of the present disclosure. While shown in this view as a self-propelled, turf maintenance vehicle, e.g., a stand-on zero-turning-radius riding lawn mower 100 (also referred to herein simply as a "vehicle" or "mower"), such a configuration is not limiting. That is, while embodiments are described herein with respect to a stand-on riding mower, those of skill in the art will realize that this disclosure is equally applicable to other types of mowers (e.g., walk-behind or sit-down), as well as to other types of ZTR maintenance vehicles (e.g., aerators, spreader/sprayers, dethatchers, debris management systems (e.g., blowers, vacuums, sweeper, etc.), general purpose utility vehicles, and the like) without limitation. That is to say, the terms "grounds maintenance vehicle" and "turf maintenance vehicle" are understood herein to include maintenance vehicles intended for operation upon either or both of turf (e.g., grass) and non-turf (e.g., concrete) surfaces.

It is noted that the terms "have," "includes," "comprises," and variations thereof do not have a limiting meaning and are used in the open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the referenced figure, or from the perspective of one operating the mower 100 while the mower is in an operating configuration, e.g., while the mower 100 is positioned such that wheels 106 and 108 rest upon a generally horizontal ground surface 103 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the other part/feature (e.g., part/feature identified with a "b" suffix). Similarly, the description of a part/feature identified with no suffix may apply, unless noted otherwise, to both the corresponding left and right part/feature.

As shown in FIGS. 1 and 2, the mower 100 may include a chassis or frame 102 having a front end 125 and a rear end 127. The frame 102 may support a traction and steering control system 101 (see FIG. 5) providing an energy source 104, which may include one or both of a generator and a battery. The frame 102 may be supported upon the ground surface 103 by independently driven ground-engaging members that, in one embodiment, include first (e.g., left) and second (e.g., right) ground-engaging drive members or wheels 106 (106*a*, 106*b*) that are connected to opposite first and second (left and right) sides, respectively, of a rear portion of the frame 102. The traction and steering control system may further include separate first and second motors 107 (e.g., right electric wheel motor 107*b* shown in FIG. 2, left electric wheel motor 107*a* shown in FIG. 4) connected to the first and second drive wheels, respectively and powered by the energy source, so that the traction and steering control system can provide power independently to each of the drive wheels 106 and thus rotate the drive wheels (relative to the frame) to selectively propel and steer the mower 100 over the ground surface 103. A pair of front swiveling ground-engaging members (e.g., caster wheels 108*a*, 108*b*) may passively support a front portion of the mower 100 in rolling engagement with the ground surface 103. Of course, other drive configurations (e.g., actively steered front and/or rear wheels, tri-wheel configurations, front-wheel or all-wheel-drive, etc.) and vehicles using ground-engaging members other than wheels (e.g., tracks, rollers), are certainly contemplated within the scope of this disclosure. While described and illustrated herein as electric motors 107, embodiments of the present disclosure may alternatively utilize any electronically-controlled motor, e.g., a hydraulic motor whose output is controlled by electronic signals/actuators, without departing from the scope of this disclosure.

One or more control inputs 110, e.g., first (e.g., left) control input (configured as drive control lever 110*a* in the illustrated embodiments) and second (e.g., right) control input (configured as drive control lever 110*b* in the illustrated embodiments), may also be provided. The drive control levers 110 are movably (e.g., pivotally) coupled to the frame 102 such that they may pivot forwardly and rearwardly under the control of an operator standing on an operator platform 112. The platform is shown in a deployed position in FIGS. 1 and 2 to receive the standing operator. However, some embodiments of the mower 100 may allow the platform to fold upwardly against a back side of the frame to permit operation by an operator walking behind the mower.

Figure 5:
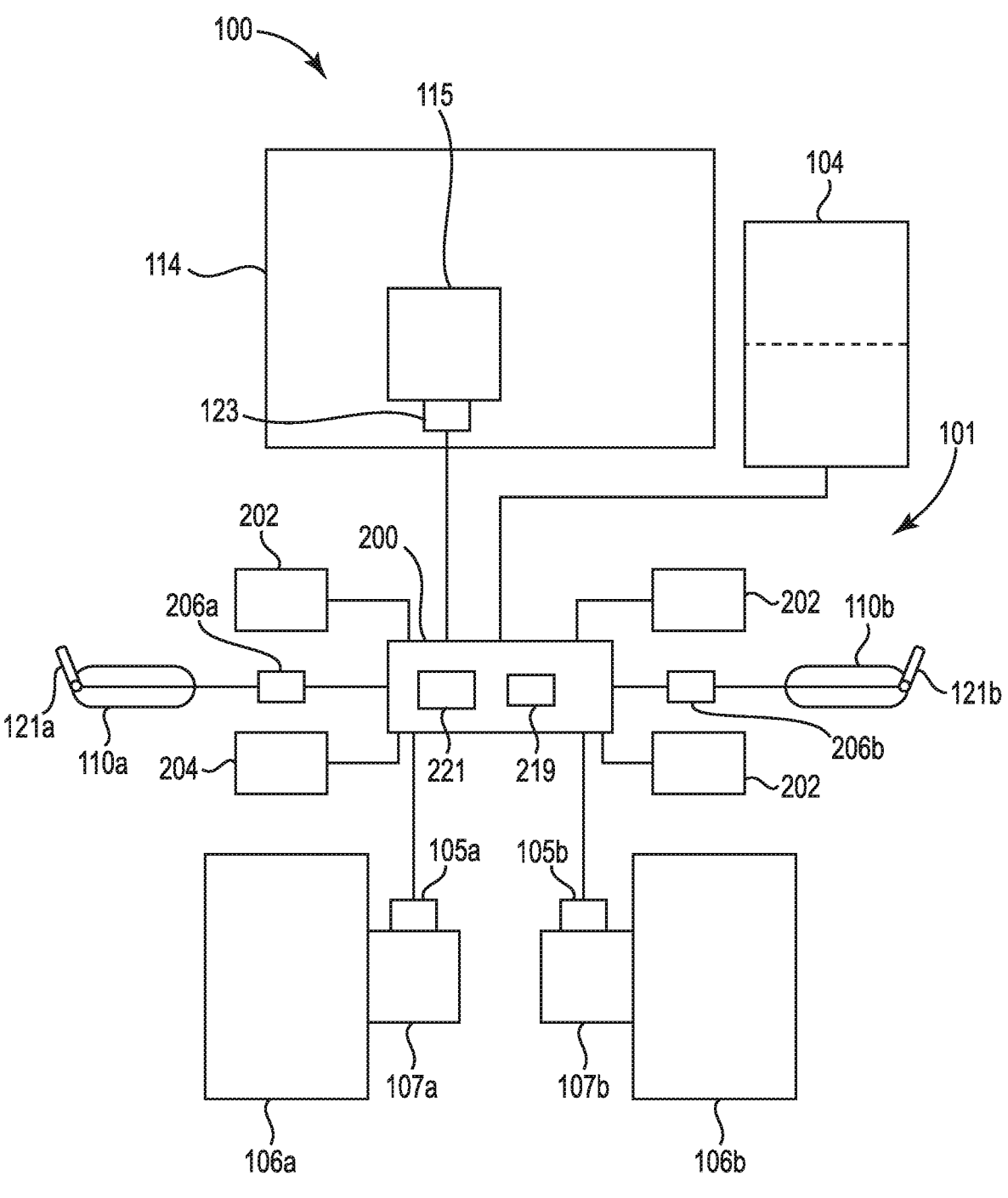
FIG. 5 is a diagrammatic view of the traction and steering control system of FIG. 4.

The drive control levers 110 are operable to independently control speed and direction of their respective drive wheels 106 via manipulation of a traction and steering control system that, in the illustrated embodiments, includes (among other components) the electric wheel motors 107 and an electronic controller (EC) 200 (see FIG. 5). While illustrated herein as incorporating separate drive control levers 110, other controls, e.g., single or multiple joysticks or joystick-type levers, steering wheel, trackpad, touchscreen, rotatable dial or knob, etc., may also be used without departing from the scope of the disclosure. In fact, any operator controls capable of communicating operator intent from a first input (e.g., speed input) and a second input (e.g., direction input) to the traction and steering control system are contemplated. For example, a single joystick may provide a proportional first input when moved from center either forwardly (for forward speed) or rearwardly (for reverse speed), while providing a proportional second input when moved from center to the left (for left turning) or right (for right turning). Other embodiments may utilize a first joystick for forward and reverse inputs, and a second joystick for left and right inputs. Although these and other operator inputs/controls are certainly contemplated, embodiments are, for the sake of brevity and without limitation, described and illustrated herein as dual drive control levers as is generally known for use with conventional ZTR vehicles.

The drive control levers may each be independently pivotable between a forward stop 109 and a rearward stop 111. With the exceptions described herein, movement of the control levers 110 forwardly from an intermediate neutral position toward the forward stop results in an increase in speed of the associated drive wheel 106. For example, with the exceptions described herein, moving the left drive control lever 110*a* from its neutral position to a position where it abuts the forward stop 109 may generally result in the left drive wheel 106*a* accelerating, in proportion to the position of the left drive control lever, from zero to a maximum forward speed of the left drive wheel. Similarly, movement of the drive control lever 110*a* from the neutral position to a position wherein it abuts the rearward stop 111 may generally result in the left drive wheel 106*a* accelerating, in proportion to the position of the left drive control lever, from zero to a maximum rearward speed of the left drive wheel. Speed and rotational direction of the drive wheels are thus variable such that the mower may move forwards, backwards, and execute turns including small—(or even zero-) radius turns. While various embodiments are contemplated, the drive wheels 106 may rotate about a common axis 222, i.e., the drive wheels 106 may be coaxial to one another.

An implement adapted to perform a maintenance task, e.g., a lawn mower cutting deck 114, may be connected to, or otherwise carried by, the frame 102 of the mower 100 generally between the drive wheels 106 and the caster wheels 108. The cutting deck 114 may include a deck housing 117 that partially defines an enclosure forming a downwardly-opening cutting chamber (not shown). The cutting chamber may partially surround one or more rotatable cutting blades (blade 113 visible in FIG. 3), each attached to a blade spindle assembly 119 (see FIG. 4). Of course, other cutting decks (e.g., out-front decks, towed decks, reel units, etc.), as well as other implements (aerators, snowthrowers, plows, etc.), are contemplated within the scope of this disclosure.

Figure 3:
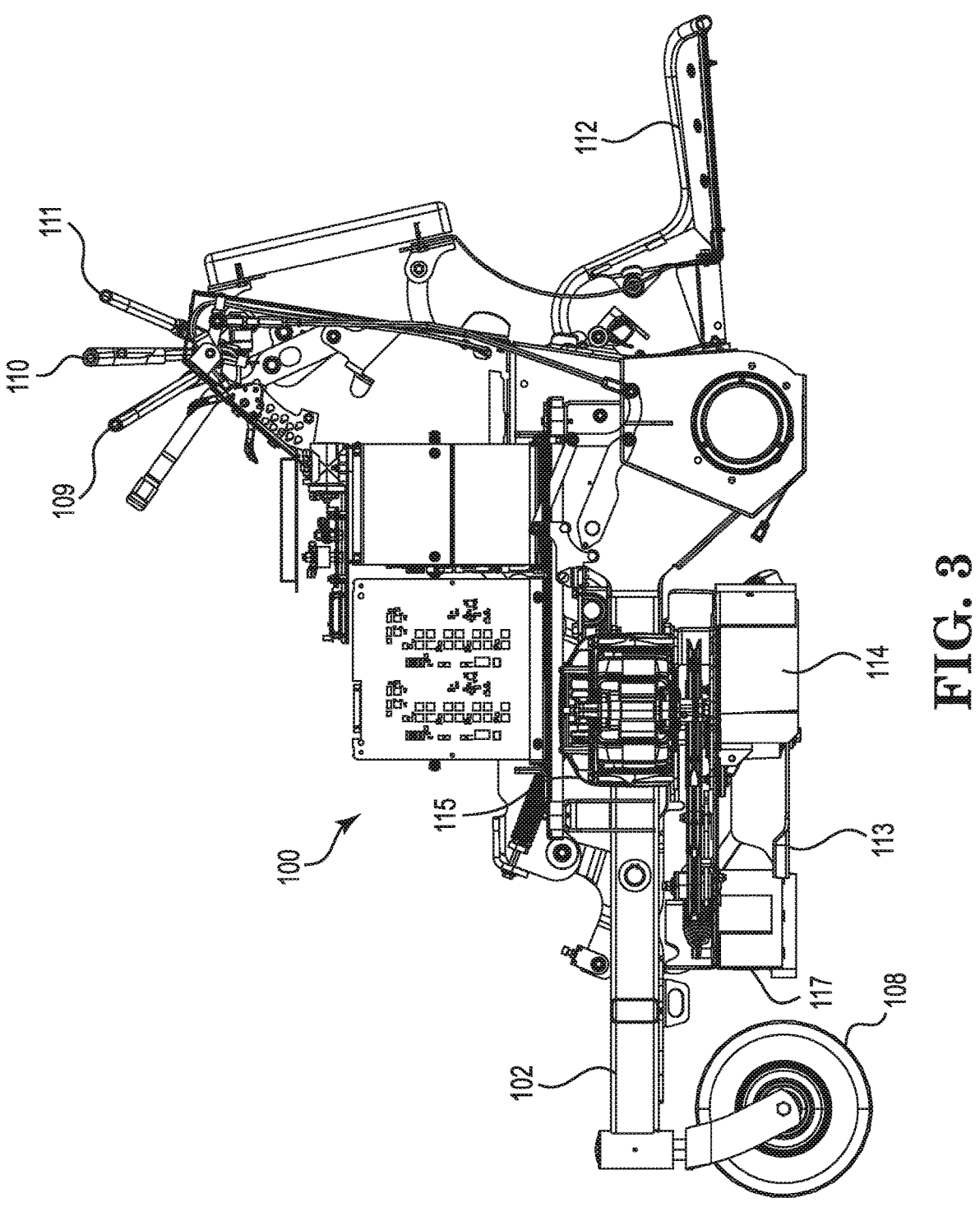
FIG. 3 is a side section view of the mower of FIG. 1, again with some structure/components removed for illustration purposes.
Figure 4:
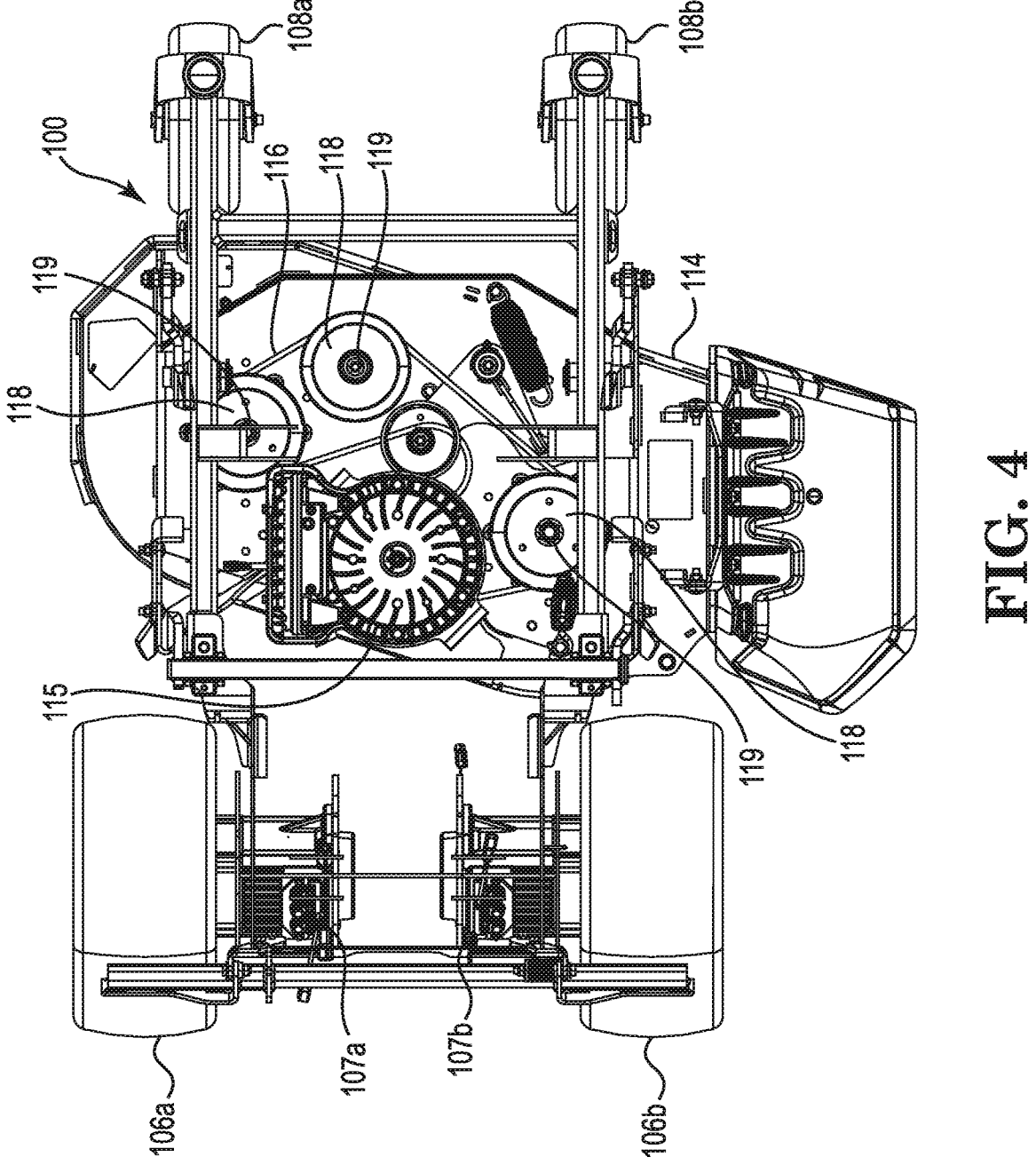
FIG. 4 is a top section view illustrating portions of a traction and steering control system in accordance with embodiments of the present disclosure.

The mower 100 may further include a deck motor 115 as shown in FIGS. 3 and 4. The deck motor 115 may also receive power from the energy source 104. In the illustrated embodiment of FIG. 4, the deck motor 115 may drive an endless belt 116 that engages pulleys 118 on each blade spindle 119 as shown. Accordingly, when the deck motor is energized, the cutting blade 113 associated with each spindle 119 may rotate.

During operation, power is selectively delivered by the energy source 104 to the cutting deck 114 (e.g., to the spindles 119 via the deck motor 115) and to the drive wheels 106 (via the independent wheel motors 107), whereby the cutting blades rotate at a speed sufficient to sever grass and other vegetation as the deck 114 passes over the ground surface 103. Typically, the cutting deck 114 includes an operator-selectable height-of-cut control system 120 (see FIGS. 1 and 2) to allow deck height adjustment relative to the ground surface 103.

FIG. 5 is a diagrammatic view of the exemplary traction and steering control system 101 and related components. As described above, the energy source 104 may provide power to both the deck motor 115 and the wheel motors 107, each of which may include a separate or integral motor controller (see motor controllers 105a, 105b and motor controller 123). The motor controllers 105 and 123 may provide power delivery/management and various sensors (e.g., temperature, speed, etc.) for their respective motors. The energy source 104 can connect to the various motors and other components either directly or indirectly (e.g., via a vehicle controller area network (CAN) bus). Accordingly, the interconnections shown in FIG. 5 between various components is for illustration purposes only and is not necessarily intended to illustrate the actual interconnections.

As described below, the mower may further include the EC 200 that receives various inputs and, based upon preprogrammed logic, outputs commands to various components such as the wheel motors 107. Additionally, the EC may monitor various other functions and processes regarding vehicle operation. For example, the EC may monitor interlocks such as operator presence sensors (to detect whether the operator is in position upon the platform 112) and a parking brake sensor that, for example, must be satisfied before various mower operations begin.

Moreover, the EC 200 may be adapted to receive a signal representing one or more operational parameters of the mower via one or more sensors or switch(es) 202. As used herein, "operational parameters" refers to dynamic parameters of the vehicle during vehicle operation. These sensor(s)/switch(es) 202 may include (but are not limited to): temperature sensor(s) to monitor temperature of the motors 115, 107 (which sensors may be incorporated into or otherwise monitored by the respective motor controllers 123, 105); a vehicle true ground speed sensor, etc. In some embodiments, the set of sensors 202 may include an inertial measurement unit (IMU) 204, which may utilize a variety of sensors (e.g., accelerometers, gyroscopes) to measure various vehicle accelerations (e.g., accelerations along any one or more axes), slopes, and directional headings of the mower 100. As used herein, vehicle "slope" or "slopes" refers to the actual angular orientation of the mower in one, two, or three-dimensional space. For example, slope may refer to vehicle/mower tilt about a first axis ("side-to-side" tilt), a second axis ("front-to-back" tilt) or any other designated axis (sliding or rotation about a vertical or yaw axis). Moreover, "vehicle true ground speed," as used herein, is defined as a magnitude of the vector component of vehicle velocity that is parallel to the ground surface 103 along which the center of mass of the mower/vehicle 100 moves. In other embodiments, independent sensors may provide this or other information regarding vehicle slope, vehicle linear acceleration, vehicle centripetal acceleration, and vehicle true ground speed. In some embodiments, a sensor, or the motors themselves (e.g., via the controllers 105, 115), may further provide a signal to the EC 200 indicative of one or both of a torque and a torque limitation of the respective motor. The signals from these sensors/switch(es) 202 (including the IMU 204)—which may be connected to the CAN bus—may be utilized as inputs to the EC 200. Moreover, as further described below, the EC may utilize these signals to influence command outputs to the wheel motors 107. As described in more detail below, the EC 200 may thus receive the first and second input signals (e.g., from lever position sensors 206; described below), as well as receive a signal or signals representing one or more operational parameters of the mower, wherein the latter may represent an operational parameter selected from the group including: vehicle slope; vehicle linear acceleration; vehicle centripetal acceleration; and vehicle true ground speed. The signal or signals may, in addition or alternatively, be a signal or signals representing an operational parameter selected from either or both of: a torque detected at one or both of the first and second drive wheels/members; and a torque limitation detected at one or both of the drive wheels/members (e.g., such torque or torque limitation may be detected by the motor controllers 105). In still other embodiments, the signal or signals may alternatively or additionally represent an operational parameter indicative of an intended turn center of the vehicle. Regardless of the operational parameter(s) utilized, the EC may then generate and transmit output commands to the traction and steering control system 101, wherein such output commands are dependent or based upon values of both: the first and second input signals; and the signal(s) representing the one or more operational parameters.

The sensors 202 may further include first and second input sensors that are, in the illustrated embodiments, configured as lever position sensors 206a, 206b. The sensors 206a, 206b are operable to monitor or sense a position of the control levers 110a, 110b, respectively (or otherwise detect manipulation of the first and second control inputs), and generate first and second (lever position) input signals, respectively, which are then received by the EC 200. Accordingly, the EC may continuously monitor the absolute and relative positions of the drive control levers 110. As used herein, the monitoring of drive control lever positions (or otherwise monitoring of control inputs) may include monitoring a change in drive control lever positions (or change in control inputs).

As shown in FIG. 5, the EC 200, which may be carried on the frame 102, may include a processor 221, memory 219, and other components necessary or beneficial to EC operation. The memory 219 may include computer-readable instructions that, when executed, e.g., by the processor 221, cause the EC 200 to perform various functions. The memory 219 may include any volatile, non-volatile, magnetic, optical, and/or electrical media, such as a random access memory (RAM), read-only memory (ROM), non-volatile RAM (NVRAM), electrically-erasable programmable ROM (EEPROM), flash memory, and/or any other digital media. While shown as both being incorporated into the EC 200, the memory and the processor could be contained in separate modules. Moreover, the EC 200 could be combined with other control modules so that all electronic functions of the vehicle are combined into one component.

The processor 221 of the EC 200 may include any one or more of a microprocessor, a microcontroller, a digital signal processor (DSP), an application specific integrated circuit (ASIC), a field-programmable gate array (FPGA), and/or equivalent discrete or integrated logic circuitry. In some examples, the processor 221 may include multiple components, such as any combination of one or more microprocessors, one or more controllers, one or more DSPs, one or more ASICs, and/or one or more FPGAs, as well as other discrete or integrated logic circuitry. The functions attributed to the EC 200/processor 221 herein may be embodied as software, firmware, hardware, or any combination thereof. While described herein as a processor-based system, an alternative EC could utilize other components such as relays and timers to achieve the desired results, either alone or in combination with a microprocessor-based system.

In one or more embodiments, the exemplary systems, methods, and interfaces may be implemented using one or more computer programs using a computing apparatus such as the processor 221 and memory 219. Program code and/or logic described herein may be applied to input data to perform functionality described herein and generate desired output information. The output information may be applied as an input to one or more other devices and/or methods as described herein or as would be applied in a known fashion. In view of the above, it will be readily apparent that the EC functionality as described herein may be implemented in any manner known to one skilled in the art.

The EC 200 may receive inputs from all sensors 202 (including, for example, the IMU 204 and/or the first and second input signals from the lever position sensors 206). The EC may then analyze these inputs and, based upon pre-programmed logic, output commands to each of the motors 107. Unlike a conventional mechanical interconnection between the control levers and the motors, however, the EC 200 may output commands to the wheel motors 107 that may or may not be proportional or otherwise directly correspond to the particular positions of the control levers 110 (i.e., to the operator inputs).

Figure 6:
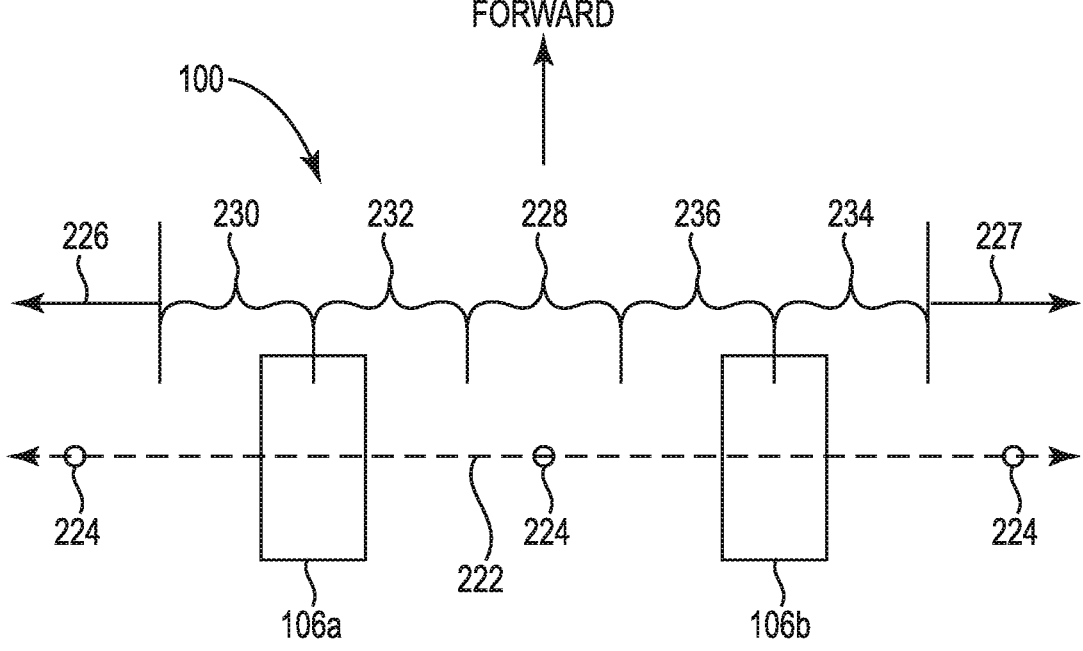
FIG. 6 is a diagrammatic view of drive wheels of the mower of FIG. 1, illustrating various regions or zones along which a vehicle turn center may be located during operation.

As an example, FIG. 6 illustrates a diagrammatic view of the drive wheels 106a, 106b of the exemplary mower 100. The mower 100 may travel in a straight line, or may be travelling along an arc (i.e., turning). As described herein, the EC 200 may monitor the control inputs (e.g., the position of the drive control levers or a rotational position of a steering wheel) as well as various operational parameters (e.g., traction or torque at each drive wheel motor, etc.). Even if one wheel is more heavily loaded, the EC 200 may still ensure that outputs of the drive wheel motors will, for example, maintain straight-ahead mower travel when drive control lever positions indicate such travel is intended (or will maintain a turn center position based upon particular drive control lever positions).

As with most ZTR vehicles, the arc of any turn of the mower 100 has, as its turn center, a point that lies upon an arc origin line 222, wherein the line 222 is coaxial with the axis of rotation the drive wheels 106. Accordingly, when making a wide left-hand turn, the turn center 224 may be at a location within a left turning region 226 of the origin line 222. In such a turn, both drive wheels 106 are turning in the same direction (e.g., forwardly) and the turn center 224 is laterally spaced-apart from the wheel 106a by a sufficient distance such that there is little chance of the tire/wheel 106a scrubbing (i.e., where "scrubbing," as used herein, refers to any portion of the drive wheel/tire spinning faster or slower than the wheel's actual ground speed, and/or any portion of the drive wheel/tire moving in a direction that is lateral to the driving direction of the drive wheel/tire). Similarly, when making a wide right-hand turn, the turn center 224 may be at a location within a right turning region 227 of the origin line 222. In this instance, both wheels are again turning in the same direction and the turn center 224 is laterally spaced-apart from the wheel 106b by a sufficient distance such that there is little chance of the tire/wheel 106b scrubbing.

Similarly, when the operator is commanding a small- or zero—radius turn, the turn center 224 may reside within an inside turning region 228 of the origin line 222 as shown in FIG. 6. In this instance, the wheels 106a, 106b are turning in opposite directions. However, within the inside turning region 228, the turn center 224 remains sufficiently laterally spaced-apart from both wheels 106a and 106b such that there is little chance of tire scrubbing during a turn.

Problems may occur, however, when the mower 100 is travelling at or above a threshold speed, and the operator commands (e.g., manipulates the control levers 110 to direct) the mower to turn about an intended turn center that falls or lies within a scrub region (e.g., a left outer scrub region 230, a left inner scrub region 232, a right outer scrub region 234, or a right inner scrub region 236) of the origin line 222. If the turn center 224 were to lie within these regions, tire scrubbing may be more probable as one or both of the wheels 106a, 106b may be commanded to a speed that exceeds the frictional resistance to its rotation, potentially resulting in tire/turf slippage.

Embodiments of the present disclosure may reduce or even eliminate tire slipping and scrubbing in these instances. For example, by monitoring the operator's command input (determined by the position of the control levers 110), the EC may determine that the intended turn center of the vehicle falls inside one of the scrub regions 230, 232, 234, and 236. When such a determination is made, the EC may automatically select a position of an adjusted turn center that lies outside the scrub region and then automatically adjust the output commands to the wheel motors 105 such that the drive wheels 106 cause the mower 100 to turn about the adjusted turn center 224, e.g., commands the wheels to turn about a turn center that falls only within the designated turn regions 226, 227, and 228. While not wishing to be bound to any specific configuration, a first scrub region may extend laterally inboard and outboard of the left drive wheel 106a, and a second scrub region may extend laterally inboard and outboard of the right drive wheel 106b. Such an adjusted turn center 224 may be achieved by one or both of accelerating the outside drive wheel and decelerating the inside drive wheel. Regardless of how the drive wheels are accelerated, the EC 200 may seek to ensure that the operator's intended vehicle heading (as interpreted by the control lever positions) is achieved, albeit possibly by powering the drive wheels at different relative speeds than the positions of the control levers might otherwise dictate.

In some embodiments, this traction and steering control is provided by limiting a minimum speed of an inside drive wheel 106 (the drive wheel on the inside of a turn). For example, in a conventional zero-turn vehicle, if the operator is providing input to the left control lever 110a that corresponds to zero velocity of the left drive wheel (e.g., the control lever 110a is in its neutral position), and input to the right control lever 110b that corresponds to a forward velocity of 2 meters/second, the left drive wheel tire may scrub the turf. The EC 200 of the present disclosure, however, may, upon detecting such a command input, set a minimum non-zero speed of the left drive wheel 106a to ensure the turn center 224 stays within one of the designated turn regions and out of the scrub regions. Stated alternatively, the EC 200 may detect potential tire scrub prior to it occurring and automatically engage a "minimum turning radius mode" that satisfies the operator's intended directional input in a way that minimizes the chance for tire scrub.

The minimum turning radius mode may be inactive until the turn center is calculated to be at or near one of the scrub regions. In some embodiments, the minimum turning radius mode may not be engaged unless one or both of the drive wheels is operating above a threshold speed.

While not wishing to be bound to any specific methodology, size and location of the specific scrub regions may be based upon specifications of the particular mower 100, including, but not limited to: mower weight, wheel base and wheel track, and tire configuration (tread, inflation pressure, width, and diameter). Other factors including turf conditions (wet, dry) and mower pose relative to an incline (e.g., traveling uphill, downhill, across a slope) may also be considered. Accordingly, the scrub regions may be fixed for a particular vehicle, or they may dynamically change during operation. Moreover, while illustrated as generally equivalent on each side of the mower, the scrub regions may be different for each side (e.g., scrub regions 230, 232 may differ in size from scrub regions 234, 236, respectively).

As one can appreciate, ensuring the turn center 224 remains outside of a scrub region may require abrupt changes in turn center location, e.g., the turn center may need to "hop" from the left designated turning region 226 to the inside designated turning region 228. To minimize such abrupt transitions, the EC 200 may further provide smoothing algorithms that assist with this transition. That is to say, the EC 200 may provide a "smooth transition mode" that smooths transition when the drive wheels 106 change from moving in the same direction to moving in opposite directions (and vice-versa). Of course, these profiles may be different depending on the parameters of the moving turn center. For instance, a reduction in speed of the inside drive wheel may be generally linear as the turn center approaches the inside drive wheel (e.g., as the mower transitions to a sharper turn). However, after the turn center "hops" to the inside designated turning region, the EC 200 may be required to more aggressively slow the affected (inside) drive wheel to minimize abrupt mower movements.

Figure 7:
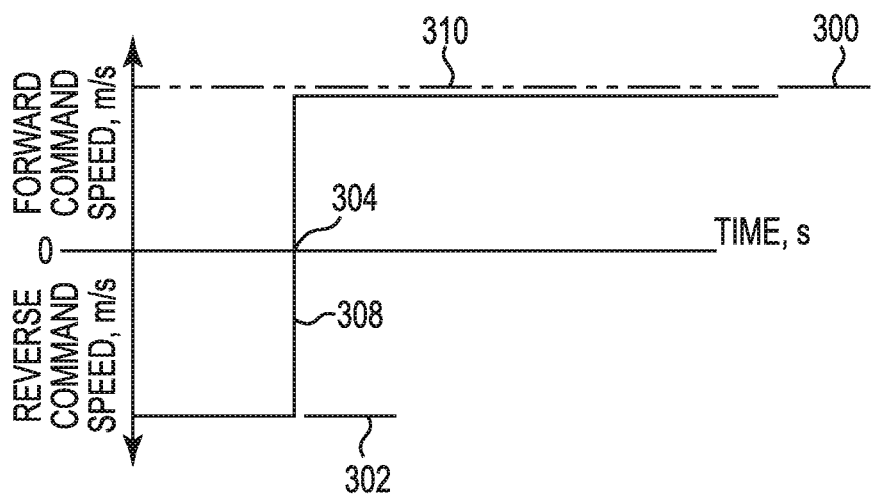
FIG. 7 is a graph of forward and reverse command speed (e.g., operator input) of left and right drive wheels of an exemplary mower versus time, wherein the left command wheel speed changes from a reverse command to a forward command while the right command speed remains unchanged.

For example, as shown in FIG. 7, a graph of operator forward and reverse commanded or command speed (correlating to control lever position) in meters/second (m/s) versus time in seconds (s) shows a situation in which the operator is commanding the right drive wheel 106*b* (right command speed shown by dash-dot-dot-dash line 310) to rotate forwardly (direction of rotation to produce forward propulsion) generally at a speed 300, and the left drive wheel 106*a* (left command speed shown by solid line 308) to rotate rearwardly (direction of rotation to produce rearward propulsion) at a speed 302. At time 304, the operator then commands the left drive wheel to rotate forwardly at the speed 300 such that the EC 200 registers an intended change between forward and reverse direction of the left drive wheel. As this occurs, the vehicle transitions from having its turn center 224 (see FIG. 6) in the inside turn region 228 to straight-ahead travel. As one can appreciate, for the left drive wheel 106*a* to transition from rearward rotation at speed 302 to forward rotation at speed 300, it must first slow to zero velocity. As a result, the turn center must travel from the inside turn region 228, across the scrub regions 230, 232 and eventually to a location infinitely outboard of the left outer scrub region 230. Such abrupt command changes may result in the left tire scrubbing during this transition. However, embodiments of the present disclosure may reduce or even eliminate scrubbing by automatically slowing the non-direction-changing wheel (e.g., right wheel 106*b*) while the direction-changing wheel (e.g., left wheel 106*a*) slows, and then accelerating both wheels together.

Figure 8:
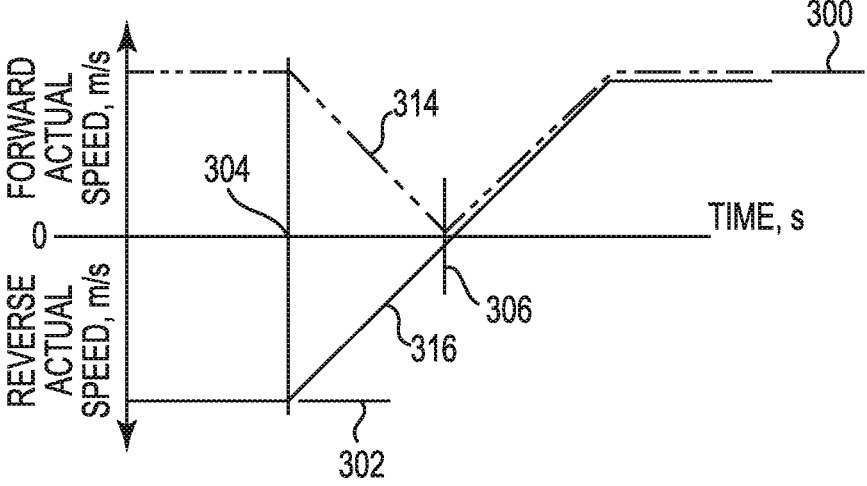
FIG. 8 is a graph of actual speed (e.g., output) of the left and right drive wheels versus time (when left and right command speeds are changed as shown in FIG. 7) when wheel speeds are controlled by a traction and steering control system in accordance with embodiments of the present disclosure.

FIG. 8 illustrates application of this exemplary smooth transition mode. Specifically, FIG. 8 illustrates how the EC 200 may command the speed of the wheel motors 107 when the control levers 110 (i.e., the command input) are manipulated as shown in FIG. 7. Accordingly, the graph of FIG. 8 is similar to that of FIG. 7, but with the vertical axis illustrating actual command output (e.g., from the EC 200 to the wheel motors 107).

As illustrated in FIG. 8, once the left control lever 110*a* is moved from a position corresponding to the speed 302 to a position corresponding to the speed 300 (at time 304), the EC 200 may immediately slow the right drive wheel speed 314 as shown (even though the right control lever 110*b* is still positioned to command the right drive wheel at the speed 300) and slow the left drive wheel speed 316 as shown. The rate at which the speeds of the drive wheels slow (deceleration) may be selected to ensure they both reach zero velocity generally at the same time 306. At time 306, the two drive wheels 106 may then accelerate at the same rate (and thus maintain a straight-ahead heading) as both wheels accelerate to the commanded speed 300.

As one can appreciate, the EC 200 may thus control the wheels 106 in a manner that does not directly correspond to the positions of the control lever positions at an instantaneous point in time. Rather, the EC 200 attempts to determine the speed and direction intended by the operator (e.g., via the control lever positions) and then determine how to transition the drive wheels 106 to that speed and direction smoothly (e.g., without any abrupt wheel direction changes) and with little or no turf-damaging scrubbing/slipping.

While the EC 200 may change the acceleration of the drive wheels 106 as described above (e.g., change a speed of a non-direction-changing drive wheel to ease a change in direction), the EC may also monitor other operational parameters and alter wheel speed and acceleration (as compared to that dictated purely by control lever positions) to assist with controlling abrupt or excessive movements of the mower 100 and to reduce wheel slip. For instance, the EC 200 (e.g., via the IMU 204) could monitor various accelerations and slow one or both drive wheels as needed to stay within predefined acceleration limits. In addition to monitoring linear acceleration, the EC 200 could also monitor centripetal acceleration and adjust a speed of the outer and/or inner drive wheel during a turn to ensure the acceleration stays within predefined limits.

In other embodiments, the IMU 204 (or other sensor capable of detecting slope of the mower 100) could indicate to the EC 200 that the mower is operating on a slope. Normally, slope operation may result in the "uphill" wheel having less traction than the "downhill" wheel. As a result, aggressive acceleration of the uphill wheel may result in scrubbing and tearing of turf. Knowing the slope orientation of the mower 100, however, the EC 200 may determine which drive wheel 106 has the least traction and limit the acceleration of this drive wheel accordingly. For instance, when travelling cross-wise across a slope, a downhill wheel may be required to drive at a faster speed (or produce more torque) than the uphill wheel in order to maintain straight-line travel (or maintain an intended heading or turn direction). While the EC 200 may merely increase the speed of the downhill wheel to address this situation, it may also, alternatively or in addition, decrease a speed of the uphill wheel. The latter may be beneficial in instances where the downhill wheel is traction- or torque-limited.

The IMU 204 (or other sensor(s)) may also allow the EC 200 to measure or monitor actual acceleration/deceleration of the mower 100. When actual acceleration/deceleration is compared to the intended acceleration/deceleration (e.g., the latter known from the positions of the control levers 110), the EC may determine if the drive wheels 106 have lost traction or otherwise are sliding, which can again result in turf damage. If sliding is detected, the EC 200 may calculate a maximum permitted acceleration/deceleration of one or both drive wheels. The EC may then limit acceleration/deceleration of one or both of the two drive wheels (regardless of control lever position) to a magnitude less than or equal to the maximum permitted acceleration/deceleration. Moreover, the EC 200 may even prevent stopping of the drive wheels until forward (or rearward) inertia of the mower is at or below a threshold value. That is to say, the EC 200 may operate in some instances in a manner similar to an anti-lock brake system in a modern automobile to ensure and/or restore traction to the drive members.

Embodiments of the present disclosure may also permit regulation of acceleration and deceleration limits. For instance, the IMU 204 may allow determination of the actual velocity of the mower 100, while the EC 200 may monitor the intended velocity (via control lever positions). The EC could then regulate the acceleration of the mower 100 once slipping is detected based upon a discrepancy between these two values. In some embodiments, enablement of this EC functionality may be controlled by a mode switch manipulatable by the operator.

Of course, other embodiments may combine various aspects described herein to provide yet additional advantages. For example, the EC 200 may monitor linear acceleration while also knowing when the mower 100 is travelling downhill. It may then limit aggressive deceleration regardless of the intended deceleration evident from the positions of the control levers.

Such control may provide advantages in other scenarios as well. For instance, the exemplary traction and steering control system may prevent the drive wheels 106 from rotating in a direction opposite the direction of travel of the mower 100 even if the control lever command inputs dictate otherwise. As a result, reverse rotation of the drive wheels when the mower is travelling forwardly may be prevented, regardless of command input, until the machine has stopped. In addition or alternatively, the drive wheels could be prevented from fully stopping until mower inertia reaches a threshold.

Still further, traction and steering control systems in accordance with embodiments of the present disclosure may separate operator turn command input from operator centerline acceleration command input, both of which are typically deduced from the relative positions of the control levers. By separating these two inputs, the EC 200 may correspondingly control them independently. For example, it is preferred during operation that mower turn response be relatively fast, while centerline acceleration response may be more gradual. Unlike a conventional hydraulic drive system, wherein control lever position corresponds directly to an acceleration of its associated drive wheel and thus to a turn center of a turn, the EC 200 may achieve the intended turn center by deciding, in real-time, whether to: accelerate an outside wheel; decelerate an inside wheel; or execute a combination of both. Accordingly, where a hydraulic system may execute the turn by accelerating the outside wheel, embodiments of the present disclosure may, where appropriate, (e.g., where torque/torque limitations on one of the motors 107, and/or ground slopes are not conducive to such acceleration) achieve the same turn by slowing the inside wheel. That is to say, the traction and steering control system could determine the operator's turn intent and then figure out how best to achieve that turn with minimal turf damage and/or with improved vehicle control/steering response.

Again, while the traction and steering control system may generate the actual command outputs (independent of the operator command inputs) to the wheel motors 107, the goal of the EC is to issue commands that satisfy the operator's intent rather than explicitly match the actual command inputs. The EC may further be capable of overriding (e.g., stopping the vehicle) the exemplary algorithms described herein when such action might benefit vehicle operation.

In some embodiments, the traction and steering control system may include algorithms that mirror the performance of a hydraulic propulsion system as found on conventional hydraulic ZTR vehicles. In such hydraulic vehicles, hydraulic wheel motors may include an orifice that permits hydraulic fluid to bleed in proportion to pressure within the motor. Accordingly, when the wheel is under higher load, fluid may bleed through the orifice in proportion to the pressure across the orifice, effectively reducing wheel speed for a given operator (drive lever) input.

Traction and steering control systems in accordance with embodiments of the present disclosure may mimic this characteristic by reducing wheel speed based upon measured current at the respective wheel motor, wherein electrical current of the wheel motor is proportional to the wheel torque. For example, algorithms may detect torque (current) at the wheels 106 (e.g., using the motor controllers 105) and, where beneficial, re-calibrate drive lever position input relative to wheel speed output based upon this measured torque. For example, if a specific drive lever position would normally correspond to a drive speed of its respective wheel of 2 meters/second, the EC may re-calibrate such that this same drive lever position now corresponds to a lower drive speed (e.g., 1 meter/second). By monitoring current at the wheel motors, embodiments of the present disclosure may therefore reduce wheel speed in relation to load at that wheel.

In some embodiments, the traction and steering control system may further include resolution controls, e.g., thumb wheels 121 (121a, 121b) as shown in FIG. 5. The controls 121 may be used to, for example, account for variations in the drive control circuits for each drive wheel 106, e.g., they may act as tracking adjusters to ensure that maximum output of each drive wheel 106 is generally identical (or that the outputs of each drive wheel differ by a desired ratio). This may be accomplished by controlling a potentiometer with each thumb wheel, the potentiometer controlling the output of the associated drive wheel motor 107.

In addition or alternatively, each thumb wheel 121 may be used to alter a resolution of its associated control input (control lever 110). For example, each thumb wheel 121 may alter the maximum velocity of its associated drive wheel. As a result, maximum centerline speed may be set at any one of multiple velocities.

While shown as using both control levers 110 and thumbwheels 121 in FIG. 5, such a configuration is not limiting as it is contemplated that embodiments providing thumbwheels (but lacking control levers) could also provide the desired control of the traction and steering control system. Alternatively, one or both of the control levers and thumbwheels could be replaced with yet other devices that can provide the desired operator input. For example, one or more joysticks (as described above) or steering wheels with foot-operated pedals are contemplated, as are steering wheels with auxiliary inputs (e.g., throttle) located thereon. Other devices adapted to provide control inputs are also envisioned. For instance, a laterally swinging control handle (similar to that described in U.S. Pat. No. 9,623,903), either with hand- or foot-operated controls may also be utilized to control the vehicle. In still yet other embodiments, remote or onboard controllers and/or computer programs may provide control inputs to the EC 200 either autonomously, semi-autonomously, or via remote-user control.

Various illustrative embodiments are within the scope of this disclosure, some examples of which are identified in the following paragraphs.

Embodiment 1. A grounds maintenance vehicle comprising: a frame comprising a front end and a rear end; first and second drive members connected to opposite sides of the frame and adapted to propel the vehicle over a ground surface; a traction and steering control system adapted to independently provide power to each of the first and second drive members; first and second control inputs; first and second input sensors adapted to detect manipulation of the first and second control inputs, respectively, and generate first and second input signals, respectively; and an electronic controller adapted to receive the first and second input signals and a signal representing one or more operational parameters of the vehicle, wherein the controller is adapted to generate output commands to the traction and steering control system based upon the first and second input signals and the signal representing the one or more operational parameters.

Embodiment 2. The vehicle of Embodiment 1, wherein the traction and steering control system comprises first and second motors connected to the first and second drive members, respectively.

Embodiment 3. The vehicle of Embodiment 2, wherein the first and second motors comprise first and second electronically-controlled motors, respectively.

Embodiment 4. The vehicle of Embodiment 3, wherein the traction and steering control system further comprises one or more of a generator and a battery adapted to power the first and second electronically-controlled motors.

Embodiment 5. The vehicle of any one of Embodiments 1-4, wherein the first and second drive members comprise first and second drive wheels, respectively.

Embodiment 6. The vehicle of Embodiment 5, wherein a speed and rotational direction of the first and second drive wheels are variable such that the vehicle may turn about a turn center that lies upon an arc origin line that is coaxial with an axis of rotation of the first and second drive wheels, wherein the output commands ensure that the turn center is located only within designated turn regions along the arc origin line.

Embodiment 7. The vehicle of Embodiment 6, wherein the designated turn regions comprise regions laterally spaced-apart from each of the first and second drive wheels.

Embodiment 8. The vehicle of any one of Embodiments 1-7, further comprising a resolution control adapted to alter a resolution of either or both of the first and second control inputs.

Embodiment 9. The vehicle of any one of Embodiments 1-8, wherein the one or more operational parameters, as described elsewhere herein, comprises a parameter selected from: an intended turn center of the vehicle; vehicle slope; vehicle linear acceleration; vehicle centripetal acceleration; vehicle true ground speed; a torque detected at one or both of the first and second drive members; and a torque limitation detected at one or both of the first and second drive members.

Embodiment 10. The vehicle of any one of Embodiments 1-9, wherein the first and second control inputs comprise first and second drive control levers, respectively.

Embodiment 11. A method of controlling a traction and steering control system of a grounds maintenance vehicle, the method comprising: monitoring first and second control inputs and generating first and second input signals representative thereof; receiving with an electronic controller the first and second input signals; detecting with the controller a signal representing one or more operational parameters of the vehicle; generating, with the electronic controller, output commands that are dependent upon values of the first and second input signals and the signal representing the one or more operational parameters; and transmitting the output commands to the traction and steering control system, wherein the traction and steering control system comprises independently driven first and second drive members adapted to propel and steer the vehicle.

Embodiment 12. The method of Embodiment 11, wherein monitoring the first and second control inputs comprises monitoring a position of first and second drive control levers, respectively.

Embodiment 13. The method of any one of Embodiments 11-12, wherein detecting the signal representing the one or more operational parameters comprises detecting a parameter selected from: an intended turn center of the vehicle; vehicle slope; vehicle linear acceleration; vehicle centripetal acceleration; vehicle true ground speed; a torque detected at one or both of the first and second drive members; and a torque limitation detected at one or both of the first and second drive members.

Embodiment 14. The method of any one of Embodiments 11-13, wherein the vehicle slope comprises an angular orientation of the vehicle in one, two, or three dimensions.

Embodiment 15. The method of any one of Embodiments 11-14, wherein detecting the signal representing the one or more operational parameters comprises detecting a signal representing an operational parameter indicative of an intended turn center of the vehicle.

Embodiment 16. The method of Embodiment 15, further comprising: determining, based upon the first and second control inputs, if the intended turn center of the vehicle falls inside a scrub region; selecting, with the electronic controller, a position of an adjusted turn center that lies outside the scrub region; and adjusting automatically with the controller the output commands such that the first and second drive members cause the vehicle to turn about the adjusted turn center.

Embodiment 17. The method of Embodiment 16, wherein the scrub region comprises: a first scrub region that extends laterally inboard and outboard of the first drive member; and a second scrub region that extends laterally inboard and outboard of the second drive member.

Embodiment 18. The method of any one of Embodiments 16-17, wherein the first drive member defines an outside drive member and the second drive member defines an inside drive member, and wherein selecting the position of the adjusted turn center comprises one or both of accelerating the outside drive member and decelerating the inside drive member.

Embodiment 19. A turf maintenance vehicle comprising: a frame comprising a front end and a rear end; coaxial first and second drive wheels connected to opposite sides of the frame and adapted to propel the vehicle over a ground surface; a traction and steering control system adapted to independently provide power to each of the first and second drive wheels, wherein a speed and rotational direction of the first and second drive wheels are independently variable such that the vehicle may turn about a turn center that lies upon an arc origin line that is coaxial with an axis of rotation of the first and second drive wheels; first and second control inputs; first and second input sensors adapted to detect manipulation of the first and second control inputs, respectively, and generate first and second input signals, respectively; and a controller adapted to receive the first and second input signals and generate output commands based thereon to the traction and steering control system, wherein the output commands generated by the controller ensure that the turn center is located only within designated turn regions along the arc origin line.

Embodiment 20. The vehicle of Embodiment 19, wherein the designated turn regions comprise regions laterally spaced-apart from each of the first and second drive wheels.

Embodiment 21. The vehicle of any one of Embodiments 19-20, wherein the traction and steering control system comprises first and second motors connected to the first and second drive members, respectively.

Embodiment 22. The vehicle of Embodiment 21, wherein the first and second motors comprise first and second electronically-controlled motors, respectively.

Embodiment 23. The vehicle of Embodiment 22, wherein the traction and steering control system further comprises one or more of a generator and a battery adapted to provide power to the first and second electronically-controlled motors.

Embodiment 24. A method of controlling a traction and steering control system of a turf maintenance vehicle during a vehicle turn, comprising: monitoring, with an electronic controller, relative positions of a first drive control lever and a second drive control lever; calculating, with the electronic controller, an intended heading of the vehicle corresponding to the positions of the first and second drive control levers; detecting, with the controller, one or more operational parameters of the vehicle; determining, with the controller, based upon the one or more operational parameters, whether to: decelerate an inside drive wheel; accelerate an outside drive wheel; or both to achieve the intended heading; and generating commands to inside and outside drive wheels to propel the vehicle along the intended heading.

Embodiment 25. A method of controlling a traction and steering control system of a turf maintenance vehicle, comprising: monitoring, with an electronic controller, relative positions of a first drive control lever and a second drive control lever; calculating, with the electronic controller, an intended deceleration of the vehicle corresponding to the positions of the first and second drive control levers; detecting, with an onboard sensor, an actual deceleration; comparing, with the controller, the intended deceleration to the actual deceleration to determine if one or both of a left and a right drive member have lost traction; and adjusting, with the controller, commands to the left and right drive members to restore traction to the left and right drive members, respectively.

Embodiment 26. A method of controlling a traction and steering control system of a turf maintenance vehicle, the method comprising: monitoring, with an electronic controller, relative positions of a first drive control lever and a second drive control lever; determining, with the electronic controller, an intended acceleration of the vehicle corresponding to the positions of the first and second drive control levers; detecting, with an onboard sensor, an actual acceleration of the vehicle; calculating a maximum permitted acceleration of one or both of a first and second drive wheel; and limiting acceleration of one or both of the first and second drive wheels to a magnitude less than or equal to the maximum permitted acceleration.

Embodiment 27. A method of controlling a traction and steering control system of a turf maintenance vehicle, the method comprising: monitoring, with an electronic controller, relative positions of a first drive control lever and a second drive control lever; determining, with the electronic controller, an intended acceleration of the vehicle; measuring an actual acceleration of the vehicle; and generating, with the electronic controller, acceleration commands that are less than or equal to the actual acceleration.

Embodiment 28. A method of controlling a traction and steering control system of a turf maintenance vehicle, the method comprising: monitoring, with an electronic controller, relative positions of a first drive control lever and a second drive control lever; determining, with the electronic controller, when a position of one or both of the drive control levers indicates an intended change between forward and reverse directions of a first drive wheel; commanding, with the electronic controller, a change in speed of the first drive wheel to zero velocity; and accelerating the speed of the first drive wheel to a first velocity calculated to provide a desired heading based upon the relative positions of the first and second drive control levers.

Embodiment 29. The method of Embodiment 28, further comprising: commanding, with the electronic controller, a change in speed of a second drive wheel to zero velocity as the first drive wheel slows to zero velocity; and accelerating the speed of the second drive wheel to a second velocity calculated to provide the desired heading based upon the relative positions of the first and second drive control levers.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A grounds maintenance vehicle comprising:
a frame comprising a front end and a rear end;
first and second drive members connected to opposite sides of the frame and adapted to propel the vehicle over a ground surface;
a traction and steering control system adapted to independently provide power to each of the first and second drive members;
first and second control inputs;
first and second input sensors adapted to detect manipulation of the first and second control inputs, respectively, and generate first and second input signals, respectively; and
an electronic controller adapted to receive the first and second input signals and a signal representing one or more operational parameters of the vehicle, wherein the controller is adapted to generate output commands to the traction and steering control system based upon the first and second input signals and the signal representing the one or more operational parameters, the electronic controller being adapted to alter a speed of one or both of the first and second drive members based upon a change in the signal representing the one or more operational parameters, and wherein the one or more operational parameters comprises a torque detected at one or both of the first and second drive members.

2. The vehicle according to claim 1, wherein the traction and steering control system comprises first and second motors connected to the first and second drive members, respectively.

3. The vehicle according to claim 2, wherein the first and second motors comprise first and second electronically-controlled motors, respectively.

4. The vehicle according to claim 3, wherein the traction and steering control system further comprises one or more of a generator and a battery adapted to power the first and second electronically-controlled motors.

5. The vehicle according to claim 1, wherein the first and second drive members comprise first and second drive wheels, respectively.

6. The vehicle according to claim 5, wherein the speed and rotational direction of the first and second drive wheels are variable such that the vehicle may turn about a turn center that lies upon an arc origin line that is coaxial with an axis of rotation of the first and second drive wheels, wherein the output commands ensure that the turn center is located only within designated turn regions along the arc origin line.

7. The vehicle according to claim 6, wherein the designated turn regions comprise regions laterally spaced-apart from each of the first and second drive wheels.

8. The vehicle according to claim 1, further comprising a resolution control adapted to alter a resolution of either or both of the first and second control inputs.

9. The vehicle according to claim 1, wherein the first and second control inputs comprise first and second drive control levers, respectively.

10. The vehicle according to claim 1, wherein the altering the speed comprises reducing the speed of one or both of the first and second drive members in response to a high load indicated by the torque.

11. The vehicle according to claim 1, wherein the altering of the speed of one or both of the first and second drive members reduces or prevents slip of the one or both of the first and second drive members in relation to load at the one or both of the first and second drive members.

12. The vehicle according to claim 1, wherein the electronic controller is adapted to determine an operator's intent during a turn based on the first and second input signals, and wherein altering of the speed of one or both of the first and second drive members minimizes turf damage during the turn.

13. The vehicle according to claim 1, wherein the electronic controller is adapted to determine an operator's intent during a turn based on the first and second input signals, and wherein altering of the speed of one or both of the first and second drive members improves one or both of vehicle control or vehicle steering response during the turn.

14. A method of controlling a traction and steering control system of a grounds maintenance vehicle, wherein the traction and steering control system comprises independently driven first and second drive members adapted to propel and steer the vehicle, the method comprising:

monitoring first and second control inputs and generating first and second input signals representative thereof;

receiving with an electronic controller the first and second input signals;

detecting with the controller a signal representing one or more operational parameters of the vehicle, wherein the one or more operational parameters comprises a torque detected at one or both of the first and second drive members;

generating, with the electronic controller, output commands to alter a speed of one or both of the first and second drive members, the output commands being dependent upon values of the first and second input signals and a change in the signal representing the one or more operational parameters; and transmitting the output commands to the traction and steering control system.

15. The method according to claim 14, wherein monitoring the first and second control inputs comprises monitoring a position of first and second drive control levers, respectively.

16. A turf maintenance vehicle comprising:

a frame comprising a front end and a rear end;

coaxial first and second drive wheels connected to opposite sides of the frame and adapted to propel the vehicle over a ground surface;

a traction and steering control system adapted to independently provide power to each of the first and second drive wheels, wherein a speed and rotational direction of the first and second drive wheels are independently variable such that the vehicle may turn about a turn center that lies upon an arc origin line that is coaxial with an axis of rotation of the first and second drive wheels;

first and second control inputs;

first and second input sensors adapted to detect manipulation of the first and second control inputs, respectively, and generate first and second input signals, respectively; and a controller adapted to receive the first and second input signals and generate output commands based thereon to the traction and steering control system, wherein the output commands generated by the controller ensure that the turn center is located only within designated turn regions along the arc origin line.

17. The vehicle according to claim 16, wherein the designated turn regions comprise regions laterally spaced-apart from each of the first and second drive wheels.

* * * * *